US012363671B2

(12) United States Patent
Eglip et al.

(10) Patent No.: US 12,363,671 B2
(45) Date of Patent: Jul. 15, 2025

(54) SYSTEMS AND METHODS FOR SELECTING A PAGING PROFILE AND REGISTRATION AREA IN A MOBILE NETWORK

(71) Applicant: Verizon Patent and Licensing Inc., Basking Ridge, NJ (US)

(72) Inventors: Helen Osias Eglip, Sammamish, WA (US); Parry Cornell Booker, Sunnyvale, TX (US); Raymond WaiMan So, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 390 days.

(21) Appl. No.: 18/155,410

(22) Filed: Jan. 17, 2023

(65) Prior Publication Data

US 2024/0244560 A1    Jul. 18, 2024

(51) Int. Cl.
*H04W 60/04*  (2009.01)
*H04W 60/02*  (2009.01)
*H04W 72/0453*  (2023.01)
*H04W 72/23*  (2023.01)

(52) U.S. Cl.
CPC ........... *H04W 60/04* (2013.01); *H04W 60/02* (2013.01); *H04W 72/0453* (2013.01); *H04W 72/23* (2023.01)

(58) Field of Classification Search
CPC ..... H04W 60/04; H04W 72/23; H04W 60/02; H04W 72/0453
See application file for complete search history.

(56) References Cited

U.S. PATENT DOCUMENTS

2020/0014762 A1 *  1/2020  Li ......................... H04L 67/562

* cited by examiner

*Primary Examiner* — Curtis B Odom (57) ABSTRACT

Systems and methods described herein employ a service profile for user equipment (UE). The UE service profile may be defined per network slice, such that a subscriber can have different registration area profiles, paging profiles, or performance profiles in different slices. According to one implementation, a network device receives a registration request requesting access to a network slice and obtains a UE service profile for the network slice. The service profile may indicate a paging profile and a registration profile associated with the UE device for the network slice.

20 Claims, 6 Drawing Sheets

| | | | |
|---|---|---|---|
| 405 ⟶ S-NSSAI ID Value | {S-SNSSAI ID list} | {S-SNSSAI ID list} | {S-SNSSAI ID list} |
| 410 ⟶ Service Type | Factory Robot {QoS, latency, jitter} | Stationary Sensors {QoS, latency, jitter} | Vehicle {QoS, latency, jitter} |
| 415 ⟶ Registration Area Type | RA1 = {TA1, TA2} RA2 = {TA3, TA4} | RA = TA1 | RA1 = {TA1, TA2, TA3} RA2 = {TA4, TA5} |
| 420 ⟶ Paging Profile Type | Profile Scheme: Last TA | Profile Scheme: Last TA | Profile Scheme: All TAs |

SYSTEMS AND METHODS FOR SELECTING A PAGING PROFILE AND REGISTRATION AREA IN A MOBILE NETWORK

BACKGROUND

Advanced wireless networks, such as Fifth Generation (5G) networks, may use network slicing to increase network efficiency and performance. Network slicing involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access network components, clouds, transport, Central Processing Unit (CPU) cycles, memory, etc. Furthermore, each network slice may be configured to meet a different set of requirements and be associated with a particular Quality of Service (QOS) class, a type of service, and/or a particular group of enterprise customers associated with mobile communication devices and/or fixed wireless access (FWA) devices.

DETAILED DESCRIPTION OF THE PREFERRED EMBODIMENTS

The following detailed description refers to the accompanying drawings. The same reference numbers in different drawings may identify the same or similar elements.

A 5G network may include registration areas and tracking areas. A registration area allows user equipment (UE) to roam freely across all the cells in it without having to perform location registration for each cell. It may not be practical to keep track of a UE in idle mode every time it moves between different cells due to the amount of signaling it would cause. It may also not be practical to page a UE across the entire network for every terminating event (e.g. an incoming call). In order to create efficiencies, therefore, cells may be grouped together into Tracking Areas (TA), and one or more TAs may be assigned to the UE as a Registration Area (RA). A registration area may be used as a base for the network to page the UE and for the UE to report its location.

Network slicing is a feature of 5G networks that enables building of dedicated logical networks on shared infrastructure. Each network slice in a 5G network may have a different performance requirement and different mobility pattern. For example, a network slice can be classified as fully mobile with a low latency requirement (e.g., for an autonomous vehicle); mobile within a limited area and with low latency (e.g., for robots within a factory); or fully stationary with low bandwidth (e.g., for sensors embedded in infrastructure). That is, different slices may provide different mobility patterns for different types of user equipment (UE). Different slices may also provide different performance characteristics.

Admission control may be a validation process in communication systems where checks are performed before a connection between a device and the system is established to see if current resources are sufficient for the proposed connection. For the purpose of admission control, a Single-Network Slice Selection Assistance Information (S-NSSAI) data element may be used to determine a paging profile and registration area for a session (e.g., the allocation and retention of service data flows). A mobile network may use a service profile to decide whether to accept a request to establish a service data flow, reject the request when resources are limited, determine a paging profile, and/or determine a registration area.

By assigning different mobility patterns, the 5G network may provide flexibility when supervising or controlling the registration area, paging area, and paging scheme of each of these network slices. As noted, the mobility pattern required by a given UE may affect the signaling load on the core network. Because of this, the network operator may consider balancing signaling resources between paging and registration area updates. Allocating a larger registration area may reduce the frequency of updates for the registration area. That is, the UE can roam around a larger registration area without incurring a registration update as compared to a smaller registration area. A larger registration area, however, may mean a larger paging area when the network attempts to reach the UE.

Methods and systems discussed herein determine a balance between registration area and paging area to reduce signaling in the 5G core network. The 5G network may include an Access and Mobility Management Function (AMF). The AMF may include the S-NSSAI as a category to determine a paging profile and a registration area of a session. The AMF may determine the allowed NSSAI assigned per UE and include knowledge of the identity of the slice per session. Different mobility patterns and performance requirements (e.g., latency, bandwidth, jitter, etc.) may be considered and may be selected based on the identity of the slice.

Figure 1:
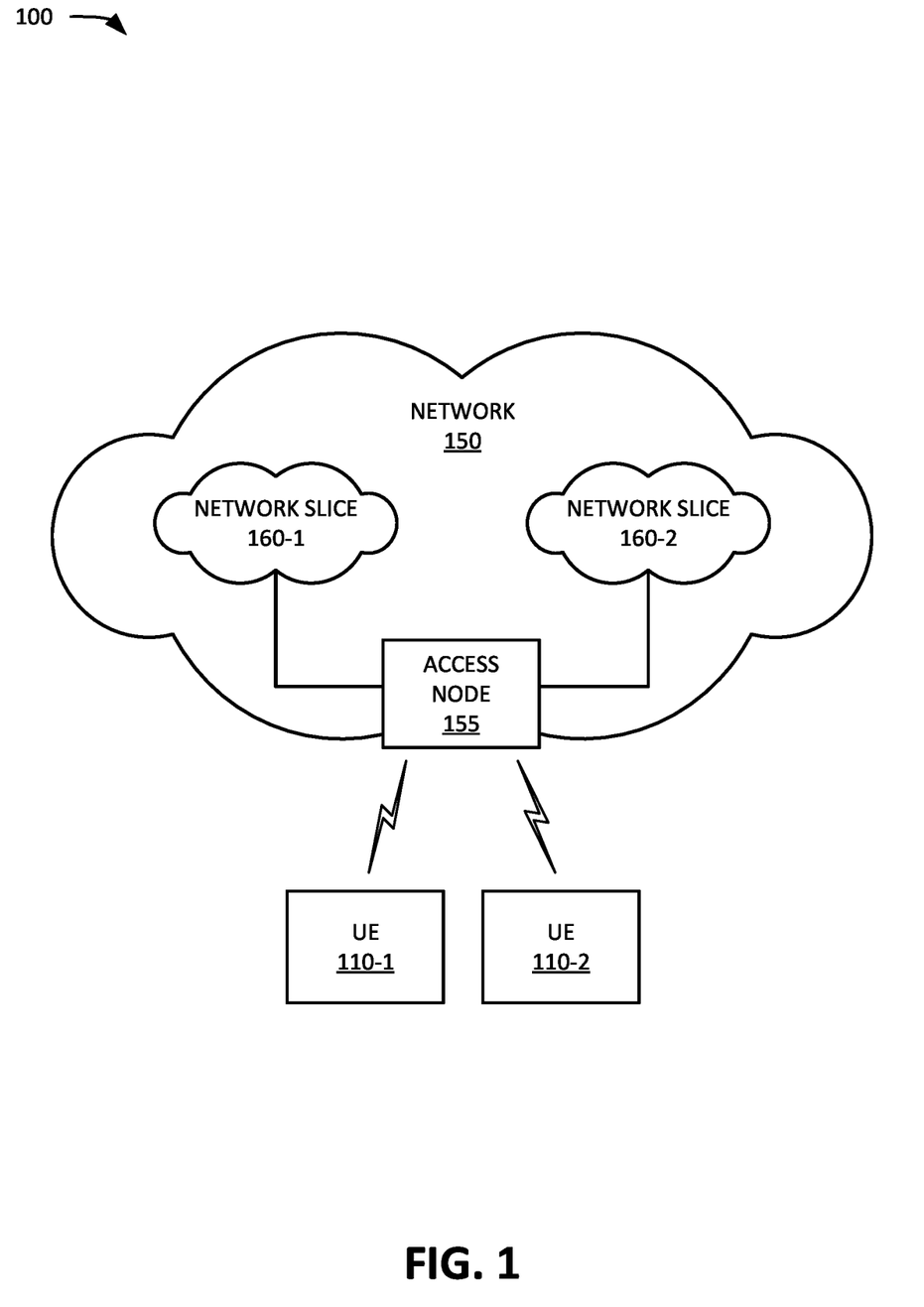
FIG. 1 is a diagram illustrating concepts described herein.

FIG. 1 illustrates the concepts described herein. As shown, UE devices 110-1 and 110-2 may establish wireless links to a network 150 through an access node 155 (e.g., components of a gNodeB or a base station). Network 150 may include, for example, a mobile network that provides various communications-related services (e.g., an Internet service, a Short Messaging Service (SMS), a Voice-over-IP (VOIP) service, video streaming service, etc.). In the particular illustration of FIG. 1, network 150 may offer an emergency call handling service and an Internet service. Network 150 may implement these services on a network slice 160-1 (for emergency call handling) and a network slice 160-2 (for Internet).

In one example, UE device 110-1 is associated with a moving vehicle (not shown) and is assigned a large registration area and an aggressive paging profile (e.g., slice 160-2). In this example, UE device 110-2 is associated with a stationary sensor (not shown) and is assigned a small registration area and a non-aggressive paging profile (e.g., slice 160-1).

The systems and methods described herein establish parameters that can be defined per slice. The parameters can be stored as part of subscriber data in a core network (such as a Unified Data Repository) and provided to an access function (e.g., an Access and Mobility Management Function) during UE registration and updated through subscription. In addition, the service profile can also be provided by a policy function (e.g., a Policy Control Function) during UE registration and updated through access management policy association updates.

Figure 2:
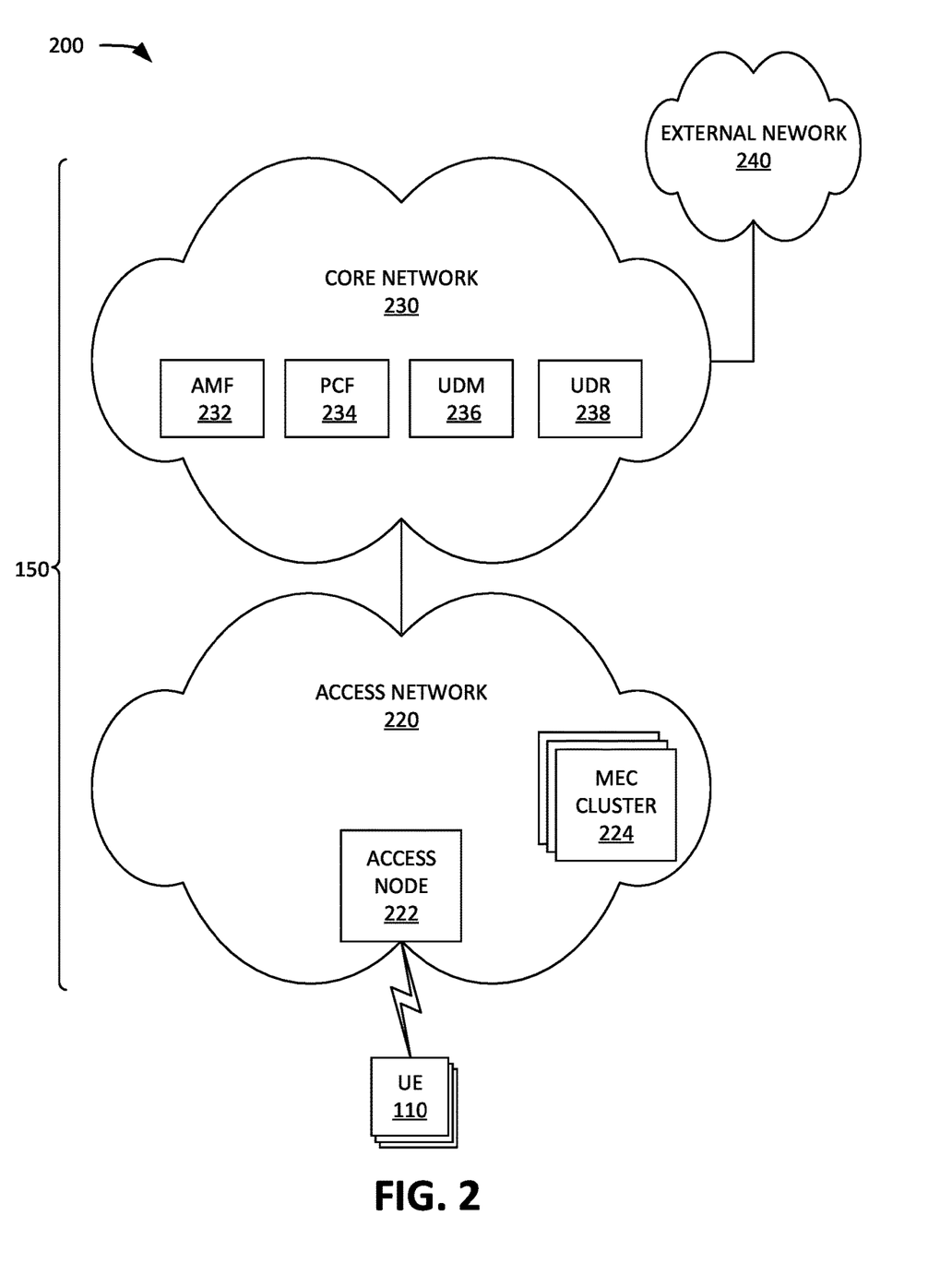
FIG. 2 is a diagram illustrating an exemplary network environment in which the systems and methods described herein may be implemented.

FIG. 2 illustrates an exemplary network environment 200 in which the systems and methods described herein may be implemented. As shown, environment 200 may include UEs 110, an access network 220, a core network 230, and an external network 240.

UE device 110 may include a wireless communication device, a mobile terminal, or a fixed wireless access (FWA) device. Examples of UE device 110 include a smartphone, a tablet device, a wearable computer device (e.g., a smart watch), a laptop computer, an autonomous vehicle with communication capabilities, a portable gaming system, and an Internet-of-Thing (IoT) device. In some implementations, UE device 110 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE device 110 may send packets to or over access network 220. As used herein, the terms "user," "subscriber," and/or "customer" may be used interchangeably. Also, the terms "user," "subscriber" and/or "customer" are intended to be broadly interpreted to include a user device (UE device 110) or a user of a user device.

When UE device 110 attaches to access network 220 for a service, UE device 110 may send signals that include S-NSSAI. Access network 220 or network components therein may use the S-NSSAI to retrieve UE service profiles and assign a priority for the subscriber in the slice corresponding to the S-NSSAI.

Access network 220 and a core network 230 may correspond to mobile network 150 of FIG. 1, for example. Access network 220 may include a radio access network (RAN) or another type of network that allows UE device 110 to access core network 230. To do so, access network 220 may establish and maintain, with participation from UE device 110, an over-the-air channel with UE device 110; and maintain backhaul channels with core network 230. Access network 220 may convey information through these channels, from UE device 110 to core network 230 and vice versa. Access network 220 may include a Long-Term Evolution (LTE) radio network, a Fifth Generation (5G) radio network and/or another advanced radio network. These radio networks may include many wireless stations and components referred to herein as an access node 222 (and also sometimes referred to as Integrated Access and Backhaul (IAB) nodes).

Access node 222 may correspond to access node 155 of FIG. 1, for example. Access node 222 may include a Fourth Generation (4G), 5G, or another type of wireless station and/or components (e.g., evolved Node B (eNB), next generation Node B (gNB), IAB nodes, Central Units (CUs), Distributed Units (DUs), Radio Units (RUs), etc.) that include one or more Radio Frequency (RF) transceivers. Access node 222 may have the capability to enforce UE priorities, such as those described above, based on the network slice on which a service is implemented. In the embodiments described herein, because different services are implemented on different network slices, access node 222 may be configured to use network slice identifiers (i.e., S-NSSAIs) that accompany a registration request to distinguish UE priorities for different services and to prioritize access in slices. In particular, as described below, access node 222 may enforce admissions control based on UE service profiles obtained from core network 230.

As further shown, access network 220 may include Multi-Access Edge Computing (MEC) clusters 224. MEC clusters 224 may be located geographically close to access nodes 222, and therefore also be close to UEs 110 serviced by access network 220 via such access nodes. Due to its proximity to UEs 110, MEC cluster 224 may be capable of providing services to UEs 110 with minimal latency. Depending on the implementations, MEC clusters 224 may provide many core functions at network edges. In other implementations, MEC clusters 224 may be positioned at other locations (e.g., in core network 230) at which MEC clusters 224 can provide computational resources for improved performance.

Core network 230 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 230 may allow the delivery of Internet Protocol (IP) services to UE device 110, and may interface with other networks, such as external network 240.

Depending on the implementation, core network 230 may include 4G core network components (e.g., a Serving Gateway (SGW), a Packet data network Gateway (PGW), a Mobility Management Entity (MME), etc.), 5G core network components (e.g., a User Plane Function (UPF), an Application Function (AF), an Access and Mobility Management Function (AMF), a Session Management Function (SMF), a Unified Data Management (UDM) function, a Network Slice Selection Function (NSSF), a Policy Control Function (PCF), a Unified Data Repository (UDR) etc.), or another type of core network components. In FIG. 2, core network 230 is illustrated as including AMF 232, PCF 234, UDM 236, and UDR 238, which are 5G core network components. Although core network 230 may include other 5G core network components, 4G core network components, or another type of core network components, they are not illustrated in FIG. 2 for simplicity.

AMF 232 may perform registration management, connection management, reachability management, mobility management, lawful intercepts, SMS transport for UE device 110, management of messages between UE device 110 and an SMF, access authentication and authorization, and location services management. AMF 232 may provide the functionality to support non-3.sup.rd Generation Partnership Project (3GPP) access networks, and/or other types of processes. According to implementations described herein, AMF 232 may retrieve and implement UE service profiles for slice registrations and sessions. AMF 232 may be accessible by other function nodes via an Namf interface. AMF 232 may communicate with access node 222 (e.g., a gNodeB) via an N2 interface.

PCF 234 may support policies to control network behavior, provide policy rules to control plane functions (such as AMF 232), access subscription information relevant to policy decisions, perform policy decisions, and/or perform other types of processes associated with policy enforcement. PCF 234 may be accessible via an Npcf interface.

UDM 236 may maintain subscription information for UEs 110, manage subscriptions, generate authentication credentials, handle user identification, perform access authorization based on subscription data, maintain service and/or session continuity by maintaining assignment of an SMF for ongoing sessions, support SMS delivery, support lawful intercept functionality, and/or perform other processes associated with managing user data. UDM 236 may store, in a subscription profile associated with a particular UE device 110, and location update information that includes information identifying an AMF 232 associated with the particular UE device 110. UDM 236 may be accessible via a Nudm interface.

UDR 238 may provide a repository for subscriber information and other types of information that can be accessed by other components of core network 230. For example, a UE service profile can be stored as part of subscriber data in UDR 238, retrieved by UDM 236, and provided to AMF 232 during registration and updated through subscription.

External network 240 may include networks that are external to core network 230. In some implementations, external network 240 may include packet data networks, such as an Internet Protocol (IP) network.

For simplicity, FIG. 2 does not show all components that may be included in network environment 200 (e.g., routers, bridges, wireless access point, additional networks, additional UEs 110, AMF 232, PCF 234, UDM 236, UDR 238, access node 222, MEC clusters 224, etc.). Depending on the implementation, network environment 200 may include additional, fewer, different, or a different arrangement of components than those illustrated in FIG. 2.

Figure 3:
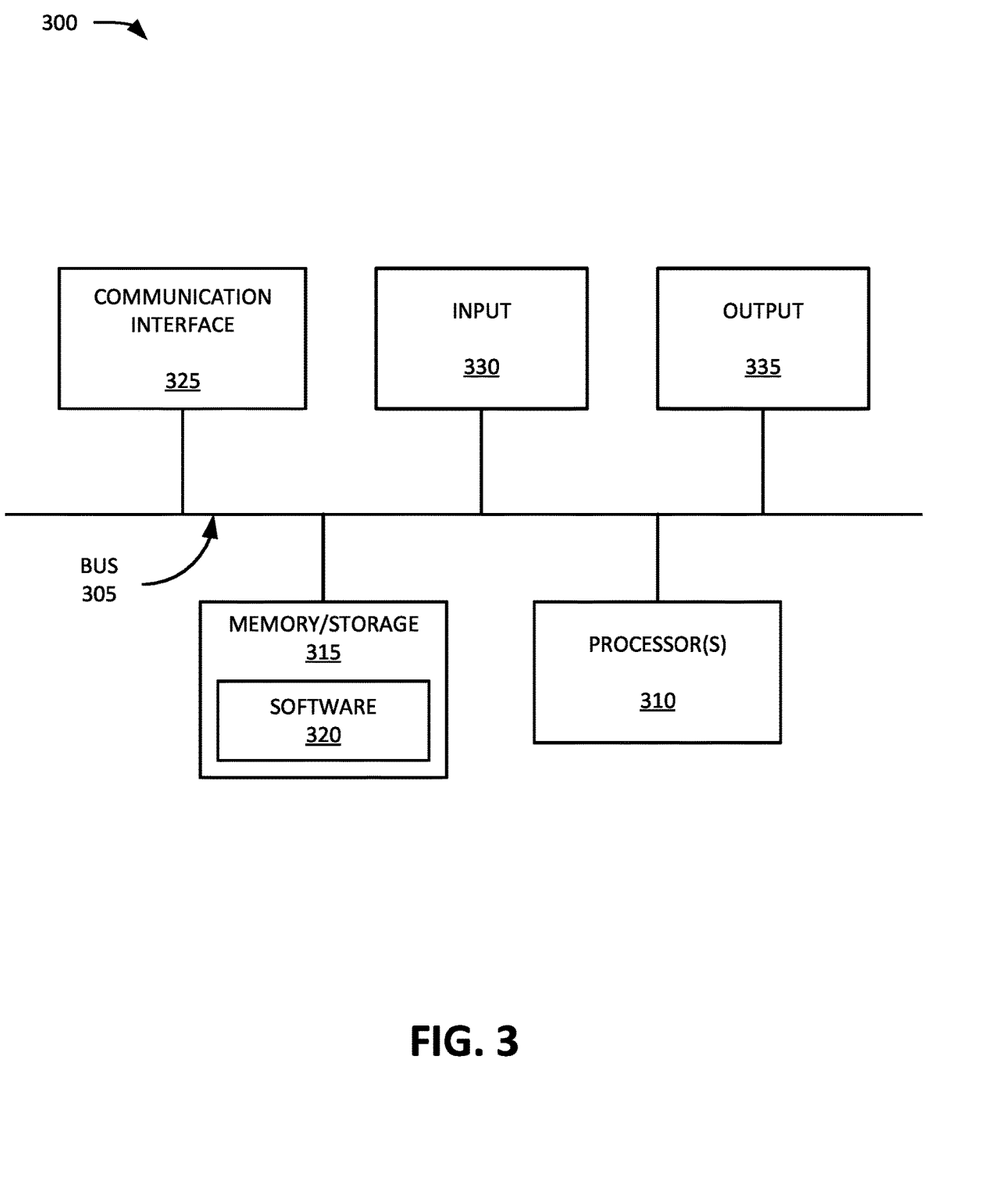
FIG. 3 is a diagram illustrating exemplary components of a device that may correspond to one or more of the devices described herein.

FIG. 3 is a diagram illustrating exemplary components of a device 300 that may correspond to one or more of the devices described herein. For example, device 300 may correspond to components included in access network 220, core network 230, UEs 110, AMF 232, PCF 234, UDM 236, UDR 238, access node 222, MEC clusters 224, and/or other elements illustrated in FIGS. 1 and 2. As illustrated in FIG. 3, according to an exemplary embodiment, device 300 includes a bus 305, one or more processors 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. For example, according to an implementation, software 320 may implement portions of slice orchestration platform 170.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers (e.g., radio frequency transceivers). Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/demultiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. In one example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
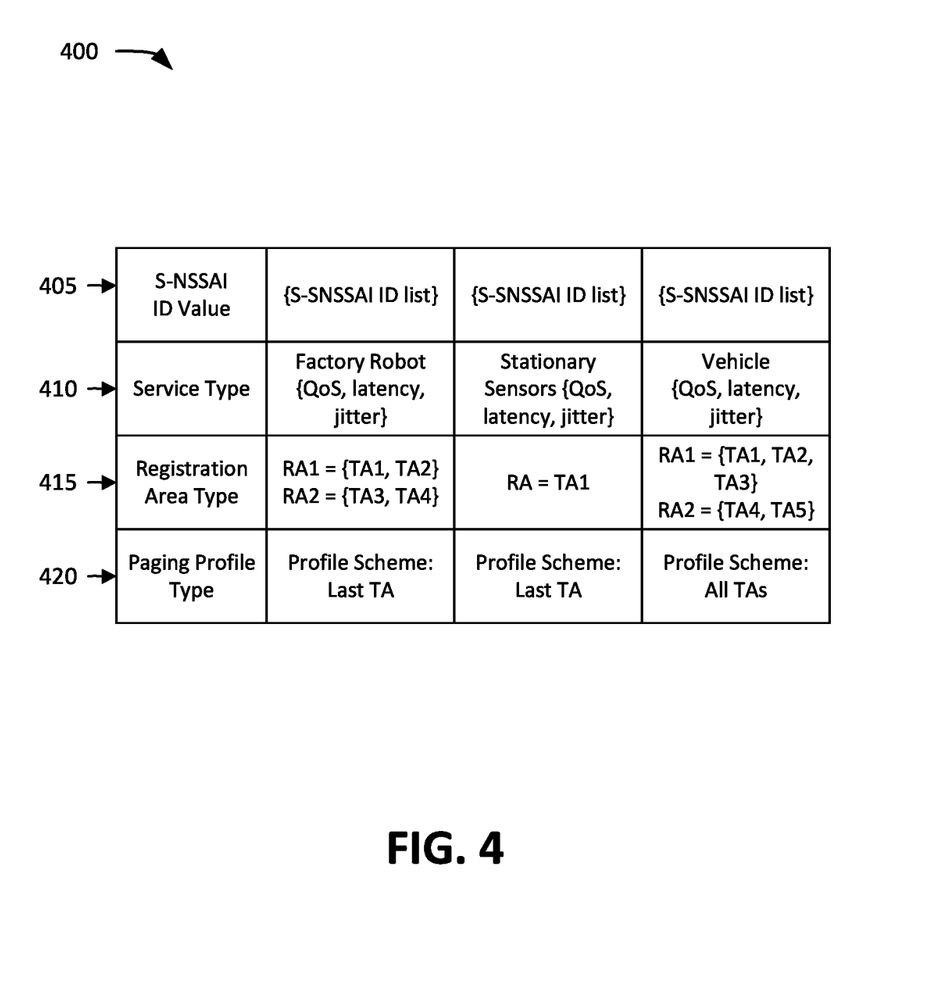
FIG. 4 is a diagram illustrating parameters of a user equipment service profile data type.

FIG. 4 is a diagram illustrating parameters of a UE service profile 400. According to an implementation, the parameters for UE service profile 400 may be defined in a structured data type according to a format for wireless network standards, such as a 3GPP standard, or another schema. As shown in FIG. 4, the service profile 400 may include a S-NSSAI value field 405, a service field 410, a registration area type field 415, and a paging profile type field 420. Fields 405, 410, 415, and 420 may allow many to many mapping of input values to output values according to regular expression mapping rules.

S-NSSAI ID field 405 may include a list of S-NSSAI ID values that may be presented by UE device 110 and allowed during a registration of UE device 110. These S-NSSAI ID values may be associated with the other fields in service profile 400. For example, an allowed NSSAI having an ID found in S-NSSAI ID field 405 may be provided with a registration area as defined in registration type field 415 and a paging profile type as defined in paging profile field 420.

Service type field 410 may define or describe the type of service provided for a UE device 110 associated with an S-SNSSAI ID from S-NSSAI ID field 405. Examples of service types include factory robot, vehicles, and/or stationary sensors. Different service types may be associated with different registration area types and paging profile types, for example. Service field 410 may also specify performance parameters, such as bandwidth, quality of service (Qos), latency, and/or jitter to be applied to the network slice. Additional or different performance parameters may also be specified in service field 410.

Registration area type field 415 may define or describe the registration area associated with the service type or a UE device 110 associated with an S-NSSAI ID found in S-NSSAI ID field 405. For example, for a vehicle (e.g., as defined in service field 410), a registration area may be large (as compared to other service types) and defined to include five tracking areas (TA1 through TA5). As another example, for a stationary sensor (e.g., as defined in service field 410), a registration area may be small (as compared to other service types) and defined to include a single tracking area (TA1). As yet another example, for a factory robot (e.g., as defined in service field 410), a registration area may be a medium size (as compared to other service types) and defined to include four tracking areas (TA1 through TA4).

Paging profile type field 420 may define or describe the type of paging associated with the service type or a UE device 110 associated with an S-NSSAI ID found in S-NSSAI ID field 405. Pagin profile field 420 may include a paging scheme that specifies an algorithm, for example, for paging UE device 110. For example, for a vehicle, the paging scheme may include paging all tracking areas in the associated registration area. For a stationary sensor, the profile scheme may include paging the previous tracking area. For a factory robot, the paging scheme may also include paging the previous tracking area Paging profile field 420 may also specify a priority level that may define the relative importance of a resource request (e.g., the subscriber's relative priority for the network slice of the corresponding S-NSSAI). Priority level may include, for example, a data type indicating a priority level (e.g., low, medium, high, etc.), a rank (e.g., 1, 2, 3, etc.), or another priority indication to be applied for the corresponding network slice. Paging profile field 420 may also specify a paging timer setting (not shown). A paging timer setting may specify how frequently UE device 110 is paged.

Figure 5:
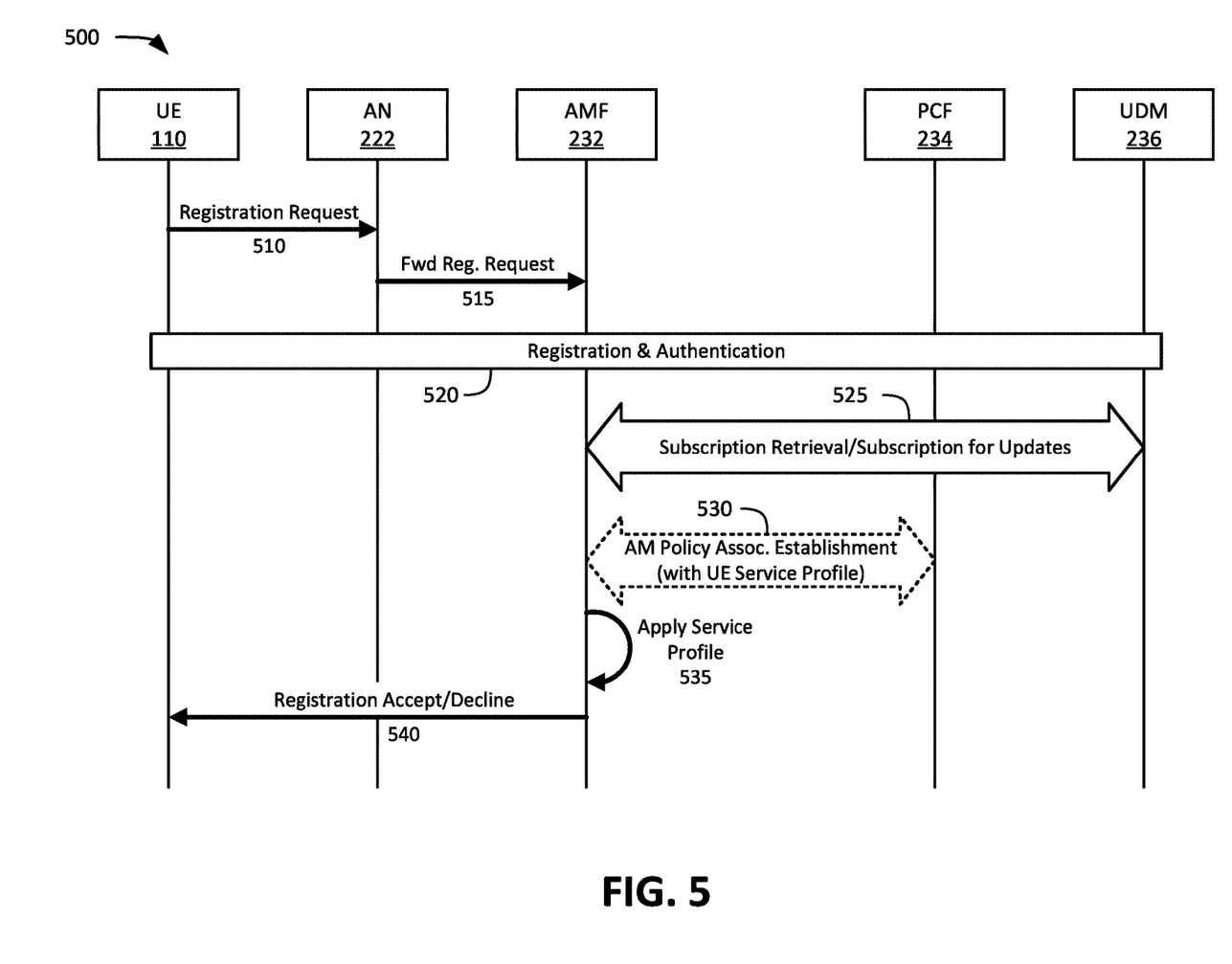
FIG. 5 is a diagram illustrating communications for a UE registration and service profile exchange in a wireless network.
Figure 6:
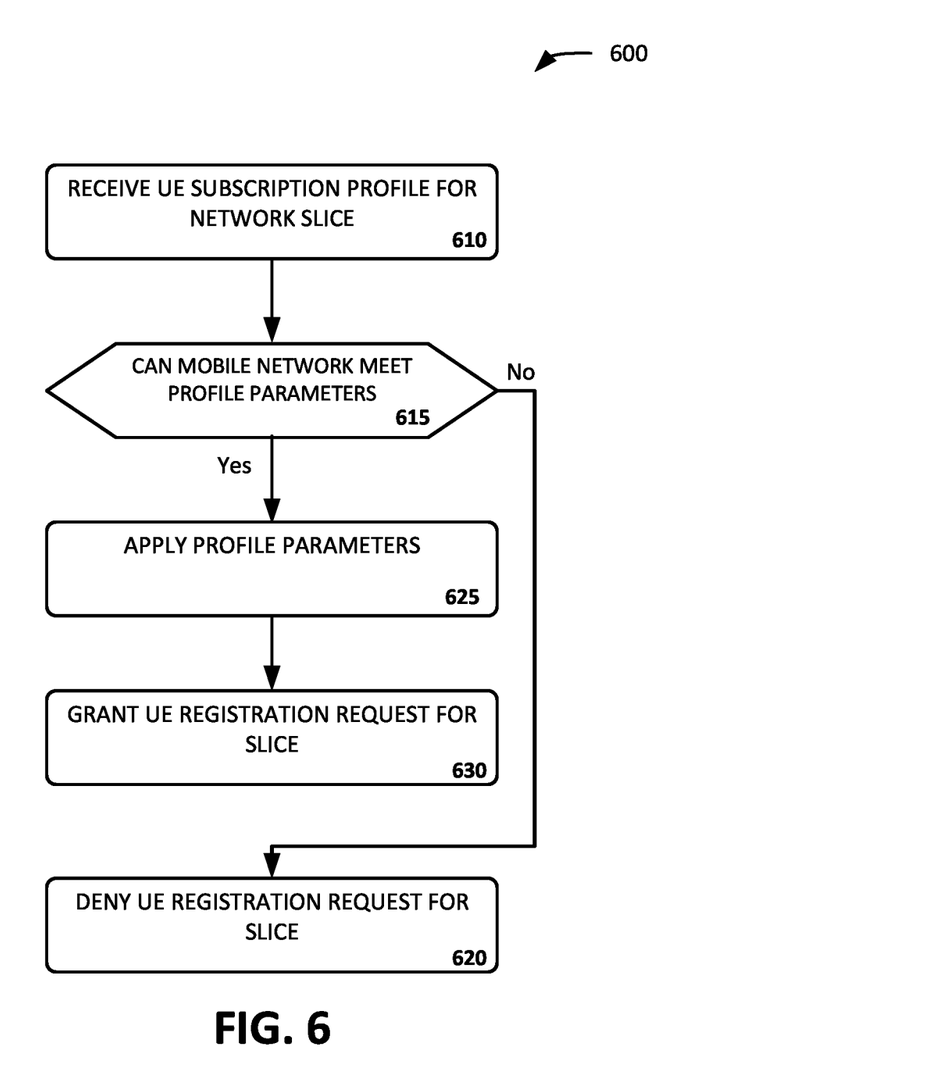
FIG. 6 is a flow diagram illustrating an exemplary process for enforcing service profile settings, according to an implementation described herein.

FIG. 5 is a signal diagram illustrating communications for a UE registration and selecting a network slice in a portion 500 of network environment 200. FIG. 6 is a flowchart illustrating an exemplary process 600 for selecting a network slice according to one embodiment. FIGS. 5 and 6 are described together. As shown in FIG. 5, network portion 500 may include UE device 110, access node 222, AMF 232, PCF 234, and UDM 236. Communications of FIG. 5 may be repeated each time a UE device 110 sends a registration request to request network service from network 150. In one implementation, process 600 may be implemented by AMF 232. In another implementation, process 600 may be implemented by AMF 232 in conjunction with one or more other devices in network environment 200.

As shown in FIG. 5, UE device 110 may send a Registration Request 510 to access node 222 with the subscriber's ID and S-NSSAI. The subscriber's ID may include, for example, the cellular telephone number of the UE device 110, or a unique ID assigned to a user/subscriber of the UE device 110. UE device 110 may send Registration Request 510 to access node 222, for example, at UE device 110 power-up to register with core network 230 such that UE device 110 may begin receiving mobile network service.

Access node 222 may receive Registration Request 510 and may forward the Registration Request (including an identification of the requested S-NSSAI) to AMF 232 as indicated at reference 515. AMF 232 subsequent to receiving Registration Request 510 from access node 222, may engage with access node 222 in performing registration and authentication processes 520 to register and authenticate UE device 110 with core network 230.

As part of registration and authentication processes 520, AMF 232 may perform a subscription retrieval process 525 with UDM 236. UDM 236 may store (e.g., in UDR 238) the UE device 110/subscriber's subscribed network service plan (e.g., a subscription profile). Through retrieval process 525, AMF 232 may retrieve, via a Nudm interface, the subscriber's subscription information from UDM 236. During the registration and authentication process 520, the UE may be assigned an allowed NSSAI.

Process 600 may include receiving service profile 400 for a network slice (block 610). AMF 232 may receive the subscriber's subscribed UE service profile 400 for the allowed NSSAI. For example, UDM 236 may provide service profile 400 in the format described above in connection with FIG. 4. Once AMF 232 has received service profile 400 (and possibly other subscriber data), AMF 232 may apply 535 the configuration identified in the service profile 400 to the current network conditions for the network slice associated with the allowed NSSAI (block 625). For example, UE device 110 may identify a S-SNSSAI that is also specified in S-NSSAI ID field 405. As such, the registration area may be applied according to the corresponding registration type field 415, the paging profile may be applied according to the corresponding paging profile field 420, and the performance may be applied according to the corresponding service type field 410.

In one embodiment, process 600 may include determining if the mobile network can provide the service according to the service profile 400 using a slice corresponding to the registration request (block 615). For example, AMF 232 may receive a UE registration request (e.g., with S-NSSAI) that triggers retrieval of a service profile 400 for the corresponding UE/network slice. AMF 232 may directly or indirectly monitor the service provided to the network slice. If the appropriate service cannot be provided in the network slice (block 615: NO) process 600 may further include removing or denying the registration to the UE (block 620). For example, process 600 may include deregistering the UE device.

Assuming the mobile network can provide the service according to the service profile 400 using the slice corresponding to the registration request (block 615: Yes), AMF 232 may accept 540 the registration request based on other admission control policies. For example, assuming correct authentication, AMF 232 may return a protocol data session (PDU) session ID to AN 201, which in turn may provide bearer setup information to UE device 110. In addition, AMF 232 may apply 535 the configuration identified in the service profile 400 to the current network conditions for the network slice associated with the allowed NSSAI (block 625) and grant the UE registration request for the slice (block 630).

Although FIG. 5 shows exemplary communications within network portion 500, in other implementations, different communications may be used than depicted in FIG. 5 to provide service profile 400 to AMF 232. Additionally, the communications and signals explained and illustrated in FIG. 5 are exemplary and may not represent each and every signal that may be exchanged.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 6, and message flows with respect to FIG. 5, the order of the blocks and message flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   receiving, by a network device and from a user equipment (UE) device, a registration request requesting access to a network slice;
   obtaining, by the network device and from stored subscriber data for the UE device, a UE service profile for the network slice, wherein the UE service profile indicates a paging profile and a registration profile associated with the UE device for the network slice, and wherein the UE service profile associates the UE device with the paging profile and the registration profile on the network slice; and
   applying, by the network device, the paging profile and the registration profile identified in the UE service profile when granting the UE device access to the network slice.

2. The method of claim 1, wherein the paging profile further includes a paging timer setting for the UE device on the network slice.

3. The method of claim 1, wherein the paging profile further includes a paging priority setting for the UE device on the network slice.

4. The method of claim 1, wherein the UE service profile includes a performance setting for the UE device on the network slice, wherein the method further comprises:
   applying, by the network device, the performance setting identified in the UE service profile when granting the UE device access to the network slice.

5. The method of claim 4, wherein the performance setting includes a quality of service, latency, or jitter settings.

6. The method of claim 5, further comprising:
   denying the registration request for the UE device when determined that the performance setting cannot be enabled for the UE device on the network slice.

7. The method of claim 1, wherein the obtaining includes:
   receiving the UE service profile from a Unified Data Management (UDM) function of a core network.

8. The method of claim 1, wherein the obtaining includes:
   receiving the UE service profile from a Policy Control Function (PCF) of a core network.

9. The method of claim 1, wherein the obtaining includes:
receiving the UE service profile as part of a subscription profile for the UE device.

10. The method of claim 1, wherein the network device includes one of: an Access and Mobility Management Function (AMF), and an access node for a radio access network.

11. A network device, comprising:
a processor configured to:
receive, from a user equipment (UE) device, a registration request requesting access to a network slice;
obtain, from stored subscriber data for the UE device, a UE service profile for the network slice, wherein the UE service profile indicates a paging profile and a registration profile associated with the UE device for the network slice, and wherein the UE service profile associates the UE device with the paging profile and the registration profile on the network slice; and
apply the paging profile and the registration profile identified in the UE service profile when granting the UE device access to the network slice.

12. The network device of claim 11, wherein the paging profile further includes a paging timer setting for the UE device on the network slice.

13. The network device of claim 11, wherein the paging profile further includes a paging priority setting for the UE device on the network slice.

14. The network device of claim 11, wherein the UE service profile includes a performance setting for the UE device on the network slice, wherein when obtaining the UE service profile, the processor is further configured to:
apply the performance setting identified in the UE service profile when granting the UE device access to the network slice.

15. The network device of claim 14, wherein the performance setting includes a quality of service, latency, or jitter settings.

16. The network device of claim 15, wherein the processor is further configured to:
deny the registration request for the UE device when determined that the performance setting cannot be enabled for the UE device on the network slice.

17. The network device of claim 11, wherein the processor is further configured to:
receive the UE service profile from a Unified Data Management (UDM) function of a core network.

18. The network device of claim 11, wherein the processor is further configured to:
receive the UE service profile from a Policy Control Function (PCF) of a core network.

19. The network device of claim 11, wherein the processor is further configured to:
receive the UE service profile as part of a subscription profile for the UE device.

20. A non-transitory computer-readable medium containing instructions executable by at least one processor, the computer-readable medium comprising one or more instructions for:
receiving, by a network device and from a user equipment (UE) device, a registration request requesting access to a network slice;
obtaining, by the network device and from stored subscriber data for the UE device, a UE service profile for the network slice, wherein the UE service profile indicates a paging profile and a registration profile associated with the UE device for the network slice, and wherein the UE service profile associates the UE device with the paging profile and the registration profile on the network slice; and
applying, by the network device, the paging profile and the registration profile identified in the UE service profile when granting the UE device access to the network slice.

* * * * *